US010922007B2

(12) United States Patent
Rathi et al.

(10) Patent No.: US 10,922,007 B2
(45) Date of Patent: Feb. 16, 2021

(54) HIGH-PERFORMANCE WRITABLE SNAPSHOTS IN DATA STORAGE SYSTEMS

(71) Applicant: Oracle International Corporation, Redwood Shores, CA (US)

(72) Inventors: Unmesh Rathi, Redwood Shores, CA (US); Santosh Sugur, Redwood Shores, CA (US); Sridhar Valaguru, Sunnyvale, CA (US)

(73) Assignee: Oracle International Corporation, Redwood Shores (CA)

( * ) Notice: Subject to any disclaimer, the term of this patent is extended or adjusted under 35 U.S.C. 154(b) by 75 days.

(21) Appl. No.: 16/417,433

(22) Filed: May 20, 2019

(65) Prior Publication Data

US 2019/0272105 A1 Sep. 5, 2019

Related U.S. Application Data

(63) Continuation of application No. 15/639,757, filed on Jun. 30, 2017, now Pat. No. 10,331,374.

(51) Int. Cl.
*G06F 3/06* (2006.01)

(52) U.S. Cl.
CPC ............ *G06F 3/065* (2013.01); *G06F 3/0619* (2013.01); *G06F 3/0664* (2013.01); *G06F 3/0683* (2013.01)

(58) Field of Classification Search
CPC ...... G06F 3/0608; G06F 3/064; G06F 3/0631; G06F 3/0674; G06F 16/11; G06F 16/122; G06F 2201/84
See application file for complete search history.

(56) References Cited

U.S. PATENT DOCUMENTS

| | | |
|---|---|---|
| 7,100,089 B1 | 8/2006 | Phelps |
| 7,379,954 B2 | 5/2008 | Shoens |
| 7,756,844 B2 | 7/2010 | Shoens et al. |
| 7,836,029 B2 | 11/2010 | Shoens |
| 7,991,791 B1 | 8/2011 | Chen et al. |
| 8,533,157 B2 | 9/2013 | Honami et al. |
| 8,533,410 B1 | 9/2013 | Corbett et al. |
| 8,806,154 B1 | 8/2014 | Gupta et al. |

(Continued)

OTHER PUBLICATIONS

A. Brinkmann, S. Effert, M. Heidebuer and M. Vodisek, "Realizing Multilevel Snapshots in Dynamically Changing Virtualized Storage Environments," International Conference on Networking, International Conference on Systems and International Conference on Mobile Communications and Learning Technologies (Year: 2006).*

(Continued)

*Primary Examiner* — Khoa D Doan
(74) *Attorney, Agent, or Firm* — Invoke

(57) ABSTRACT

Techniques for providing high-performance writable snapshots in data storage systems are disclosed. The techniques include storing a set of snapshots containing changes to a data set over time in a set of allocation units containing a series of contiguous blocks. A set of metadata blocks in the allocation units is used to track a state of data stored in the series of contiguous blocks. Ownership of the allocation units by the snapshots is also tracked in a set of allocation unit mappings between the allocation units and a set of snapshot identifiers representing the snapshots. The allocation unit mappings and metadata blocks are then used to execute writes to the data set and free blocks in the snapshots.

20 Claims, 7 Drawing Sheets

(56) References Cited

U.S. PATENT DOCUMENTS

| | | | |
|---|---|---|---|
| 8,954,383 B1 | 2/2015 | Vempati et al. | |
| 9,552,242 B1* | 1/2017 | Leshinsky | G06F 11/0709 |
| 9,753,813 B1* | 9/2017 | Fan | G06F 3/065 |
| 10,083,196 B2 | 9/2018 | Schrock et al. | |
| 10,496,599 B1* | 12/2019 | Haravu | G06F 11/1464 |
| 2003/0212752 A1 | 11/2003 | Thunquest et al. | |
| 2004/0083345 A1 | 4/2004 | Kim et al. | |
| 2005/0021565 A1 | 1/2005 | Kapoor et al. | |
| 2005/0071379 A1 | 3/2005 | Kekre et al. | |
| 2005/0138312 A1 | 6/2005 | Kubo et al. | |
| 2005/0163014 A1 | 7/2005 | Soeda | |
| 2005/0182797 A1 | 8/2005 | Adkins et al. | |
| 2006/0053139 A1 | 3/2006 | Marzinski et al. | |
| 2006/0129779 A1 | 6/2006 | Cannon et al. | |
| 2007/0055710 A1 | 3/2007 | Malkin | |
| 2007/0162716 A1 | 7/2007 | Yagisawa et al. | |
| 2007/0192560 A1 | 8/2007 | Furuhashi | |
| 2008/0140963 A1 | 6/2008 | Thomason et al. | |
| 2008/0288546 A1 | 11/2008 | Adkins et al. | |
| 2009/0300315 A1 | 12/2009 | Agombar et al. | |
| 2010/0049754 A1 | 2/2010 | Takaoka et al. | |
| 2010/0106933 A1 | 4/2010 | Kamila et al. | |
| 2010/0131727 A1 | 5/2010 | Eguchi et al. | |
| 2011/0107052 A1* | 5/2011 | Narayanasamy | G06F 3/064 |
| | | | 711/171 |
| 2011/0258391 A1 | 10/2011 | Atkisson et al. | |
| 2011/0283075 A1 | 11/2011 | Jess et al. | |
| 2011/0314246 A1 | 12/2011 | Miller et al. | |
| 2012/0096217 A1* | 4/2012 | Son | G06F 3/0616 |
| | | | 711/103 |
| 2012/0311284 A1 | 12/2012 | Nemoto et al. | |
| 2013/0054530 A1 | 2/2013 | Baker et al. | |
| 2013/0103644 A1 | 4/2013 | Shoens | |
| 2015/0161012 A1 | 6/2015 | Meier et al. | |
| 2015/0370641 A1 | 12/2015 | Susairaj et al. | |
| 2016/0098413 A1 | 4/2016 | Stephenson et al. | |
| 2016/0110268 A1 | 4/2016 | Sekiguchi et al. | |
| 2016/0110408 A1 | 4/2016 | Madhavarapu et al. | |
| 2016/0283148 A1 | 9/2016 | Nakagawa | |
| 2016/0314046 A1 | 10/2016 | Kumarasamy | |
| 2016/0350329 A1 | 12/2016 | Resch et al. | |
| 2017/0031771 A1 | 2/2017 | Binford et al. | |
| 2017/0031772 A1 | 2/2017 | Subramanian et al. | |
| 2017/0123706 A1 | 5/2017 | Algie et al. | |
| 2017/0199679 A1* | 7/2017 | Patocka | G06F 12/0877 |
| 2017/0286286 A1* | 10/2017 | Szubbocsev | G06F 3/0688 |
| 2018/0046556 A1* | 2/2018 | Marathe | G06F 3/0688 |
| 2018/0137014 A1 | 5/2018 | Li et al. | |
| 2018/0260119 A1 | 9/2018 | Atia et al. | |

OTHER PUBLICATIONS

Junwei Zhang et al: "A Storage Slab Allocator for Disk Storage Management in File System", Networking, Architecture, and Storage, 2009. NAS 2009. IEEE International Conference on, IEEE, Piscataway, NJ, USA, Jul. 9, 2009, pp. 295-302. XP031505428, ISBN: 978-0-7695-3741-2.

* cited by examiner

US 10,922,007 B2

HIGH-PERFORMANCE WRITABLE SNAPSHOTS IN DATA STORAGE SYSTEMS

INCORPORATION BY REFERENCE; DISCLAIMER

The following application is hereby incorporated by reference: Application Ser. No. 15/639,757 filed on Jun. 30, 2017. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to snapshotting of data. In particular, the present disclosure relates to high-performance writable snapshots in data storage systems.

BACKGROUND

Snapshots of filesystems, volumes, databases, and/or other data storage systems may be created to facilitate backing up and restoration of stored data. At the same time, writable versions of snapshots may be used to modify data in the snapshots during testing of the data (e.g., running a number of tests on a copy of a production database) and/or per-user customization of the data (e.g., saving of user data with a base virtual machine disk image used by multiple users).

If a snapshot is writable, modifications to data in the snapshot may be made directly to storage regions allocated to the snapshot. On the other hand, modifications to data in a read-only snapshot may be stored in a separate writable snapshot using a copy-on-write (COW) operation that copies the data to locations allocated to the writable snapshot before the data is modified at the locations. Moreover, the storage system may be required to track dependencies of the snapshots on data in other snapshots to determine when space occupied by the data can be freed.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. HIGH-PERFORMANCE WRITABLE SNAPSHOTS
4. EXAMPLE EMBODIMENT
5. FREEING BLOCKS IN A SNAPSHOTTED DATA SET
6. EXECUTING WRITES TO A SNAPSHOTTED DATA SET
7. STORING SNAPSHOTS IN A STORAGE MANAGEMENT SYSTEM
8. COMPUTER NETWORKS AND CLOUD NETWORKS
9. MISCELLANEOUS; EXTENSIONS
10. HARDWARE OVERVIEW

1. General Overview

Techniques for providing high-performance writable snapshots in data storage systems are disclosed. The techniques include storing a set of snapshots containing changes to a data set over time in a set of allocation units containing a series of contiguous blocks. A set of metadata blocks in the allocation units is used to track a state of data stored in the series of contiguous blocks. Ownership of the allocation units by the snapshots is also tracked in a set of allocation unit mappings between the allocation units and a set of snapshot identifiers representing the snapshots. The allocation unit mappings and metadata blocks are then used to execute writes to the data set and free blocks in the snapshots.

One or more embodiments described in this Specification and/or recited in the claims may not be included in this General Overview section.

2. Architectural Overview

Figure 1:
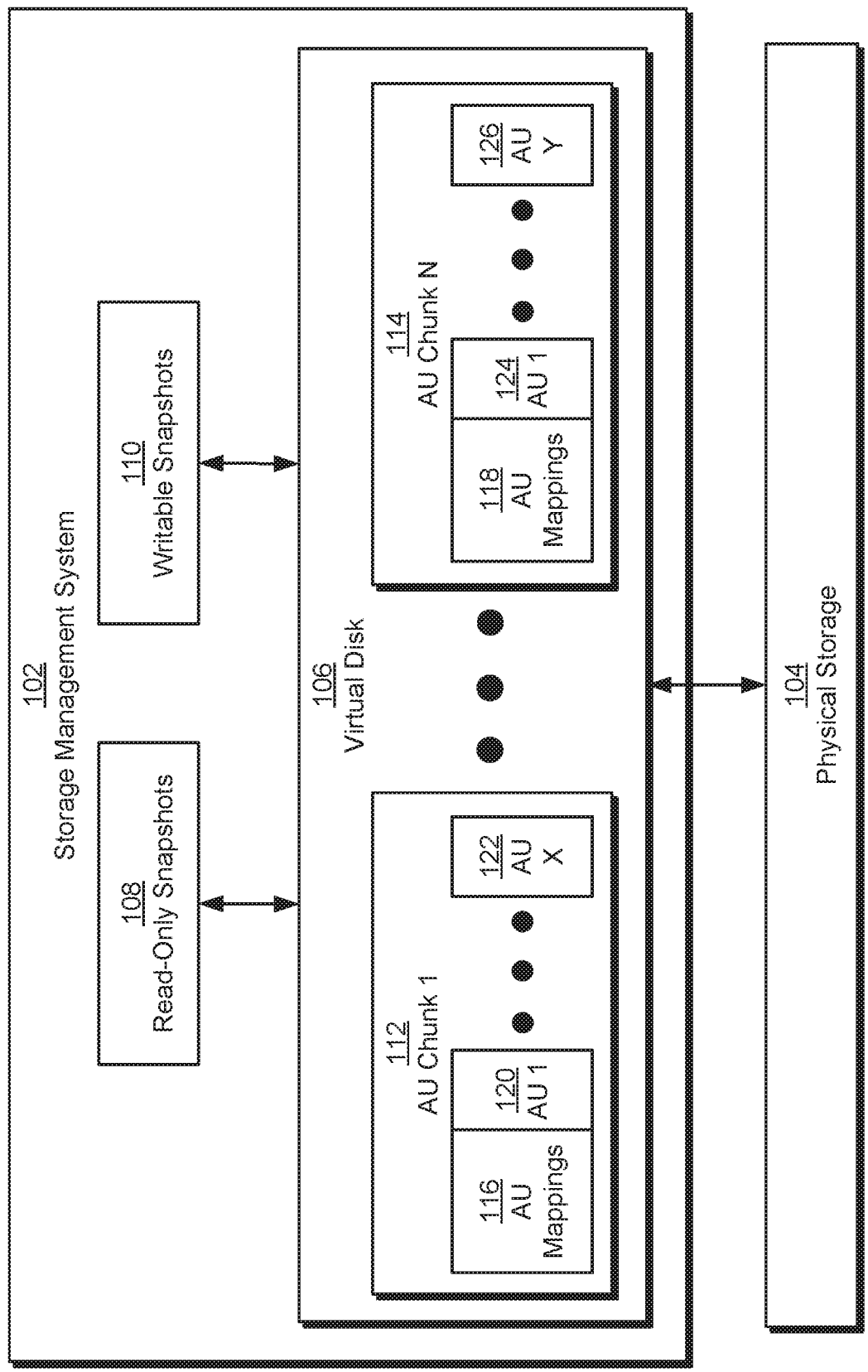
FIG. 1 illustrates a system in accordance with one or more embodiments.

FIG. 1 illustrates a system in accordance with one or more embodiments. As illustrated in FIG. 1, system 100 includes a storage management system 102 that stores a data set on physical storage 104. Physical storage 104 may include one or more hard disk drives (HDDs), solid-state drives (SSDs), optical drives, floppy disks, magnetic tape storage, Flash memory, cloud or network storage, and/or other types of physical components or devices for recording and retaining digital data. In turn, the data set stored on physical storage 104 may include audio, video, multimedia, documents, databases, files, directories, filesystems, applications, operating systems, virtual machines, and/or other types of digital data used or manipulated by computer systems or electronic devices.

Storage management system 102 may provide a layer of abstraction over physical storage 104 by presenting multiple physical storage devices as a single virtual disk 106 and/or multiple virtual disks. For example, storage management system 102 may combine five 100 GB HDDs or SSDs into a single virtual disk 106 with a capacity of 500 GB. In another example, storage management system 102 may allocate the same or different amounts of space from the five 100 GB HDDs or SSDs to form a single 400 GB virtual disk 106. In a third example, storage management system 102 may form multiple virtual disks of the same size or different sizes from one or more physical storage devices.

Storage management system 102 may additionally support snapshotting of the data set stored on virtual disk 106. In particular, storage management system 102 may store both read-only snapshots 108 and writable snapshots 110 of the data on virtual disk 106. For example, storage management system 102 may create each snapshot as the state of the data set at a given point in time. In addition, the snapshots may form a chain or tree of inheritance, in which each snapshot stores changes made to the data set over a previous snapshot as a set of differentials. Within the chain or tree, the latest snapshots in a given branch may be writable, while all other snapshots may be read-only (to preserve the use of differential snapshotting by the system). Thus, modifications to a given read-only snapshot may be stored by creating a writable version of the snapshot and storing the modifications in the writable version. In turn, the writable version may support testing of the data set, creation of a user-specific instance of a virtual machine from a shared or common virtual machine disk image, and/or other use cases related to copying and modifying data sets. At the same time, automatic, periodic and/or regular snapshotting of the data set may facilitate restoration of data from previous snapshots in the event of data corruption, accidental data deletion, exploits, and/or other problems with the data set.

Read-only snapshots 108 and writable snapshots 110 may be assigned to unique snapshot identifiers, such as integers that are bounded by a maximum value that restricts storage of the snapshot identifiers to a certain number of bytes. Creation of new child snapshots from previous parent snapshots and/or other inheritance-based dependencies among the snapshots may be tracked by storing and/or linking the snapshot identifiers using data types or structures such as linked lists, pointers, references, and/or trees. When a new child snapshot is created from an older parent snapshot, a snapshot identifier is assigned to the child snapshot and used to reference the snapshot identifier of the parent snapshot. The parent snapshot is converted to read-only, and writes to the child snapshot are performed in regions of virtual disk 106 assigned to the child snapshot.

In one or more embodiments, the system may include more or fewer components than the components illustrated in FIG. 1. For example, storage management system 102 may include, execute with, or execute within a logical volume manager, filesystem manager, and/or other components for virtualizing storage or snapshotting data. Such components may be local to or remote from each other, implemented in software and/or hardware, and/or distributed over multiple applications and/or machines. Multiple components may also be combined into one application and/or machine. Operations described with respect to one component may instead be performed by another component.

Additional embodiments and/or examples relating to computer networks are described below in Section 6, titled "Computer Networks and Cloud Networks."

In one or more embodiments, a data repository is any type of physical or virtual storage unit and/or device (e.g., a filesystem, database, collection of tables, or any other storage mechanism) for storing data. For example, the data repository may include virtual disk 106 and/or physical storage 104. Further, the data repository may include multiple different storage units and/or devices. The multiple different storage units and/or devices may or may not be of the same type or located at the same physical site. The data repository may be implemented or may execute on the same computing system as storage management system 102 or on a computing system that is separate from storage management system 102. The data repository may be communicatively coupled to storage management system 102 via a direct connection or via a network.

Information describing storage management system 102 may be implemented across any of components within the system. However, this information is illustrated within the data repository 104 for purposes of clarity and explanation.

In one or more embodiments, storage management system 102 refers to hardware and/or software configured to perform operations described herein for managing high-performance writable snapshots. Examples of such operations are described below.

In an embodiment, storage management system 102 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. High-Performance Writable Snapshots

In one or more embodiments, storage management system 102 includes functionality to improve performance related to storing and managing read-only snapshots 108 and writable snapshots 110 on virtual disk 106. As shown in FIG. 1, virtual disk 106 may include a number of allocation unit (AU) chunks (e.g., AU chunk 1 112, AU chunk n 114). For example, the AU chunks may be organized into contiguous regions on virtual disk 106. Each AU chunk may be assigned a unique identifier, such as a chunk number that monotonically increases as new AU chunks are allocated.

Each AU chunk may store data from the snapshots in a set of contiguous, fixed-size AUs and manage ownership of the data by the snapshots in a set of AU mappings. AU chunk 1 112 may include AU mappings 116 that track ownership of one set of AUs (e.g., AU 1 120, AU x 122) by one or more read-only snapshots 108 and/or writable snapshots 110, and AU chunk n 114 may include a different set of AU mappings 118 that track ownership of another set of AUs (e.g., AU 1 124, AU y 126) by the same or different snapshots. In addition, the AU chunks in the same virtual disk 106 may typically contain the same number of AUs. For example, a 10 TB virtual disk may be organized into four AU chunks. The first three AU chunks may each occupy 4 TB of the virtual disk and contain a full set of 2000 AUs that are 2 MB each, and the fourth AU chunk may occupy 1 TB of the virtual disk and contain a partial set of 500 AUs that are 2 MB each. In general, the AU chunks may be of fixed size to facilitate access to specific AUs within the AU chunks but may optionally be of variable size (e.g., to accommodate space constraints on virtual disk 106).

Each AU mapping may identify, for a corresponding AU, a snapshot "owning" the AU (i.e., the snapshot to which the AU is assigned). Continuing with the previous example, each AU chunk may reserve a 4 KB block to store AU mappings for up to 2000 AUs in a 4 TB AU chunk. Each AU mapping may store, in 2 bytes, a snapshot identifier for a snapshot assigned to the corresponding AU in the AU chunk. The offset of the AU mapping in the block may be used to identify the AU to which the snapshot is assigned (e.g., by dividing the offset by 2 to obtain a numeric identifier for the AU). Once a snapshot is assigned to a given AU, data in the snapshot may be stored in the AU. In other words, a snapshot that "owns" or is assigned an AU may be subsequently stored in the AU.

If an AU has not been assigned or is no longer assigned to a snapshot, the AU mapping for the AU may contain a reserved value that indicates that the AU is free, such as a number that is lower than the minimum possible snapshot identifier or higher than the maximum possible snapshot identifier. Because the AU mappings are used to manage a large amount of storage while occupying relatively little space, the AU mappings may be maintained in memory to expedite access and/or operations related to the AU mappings.

One or more AUs may additionally be shared by multiple snapshots. For example, sharing of AUs may be performed when data in virtual disk 106 has become highly fragmented and/or available storage in virtual disk 106 is low, resulting in a lack of completely free AUs. In another example, an AU may be shared by two or more snapshots based on a policy for allocating AUs to snapshots. To manage sharing of AUs by multiple snapshots, storage management system 102 may track ownership of different portions of a shared AU using metadata stored within the AU, as discussed in further detail below. Storage management system 102 may also change the AU mapping for the AU to store a flag and/or reserved value indicating that the AU is shared.

Figure 2:
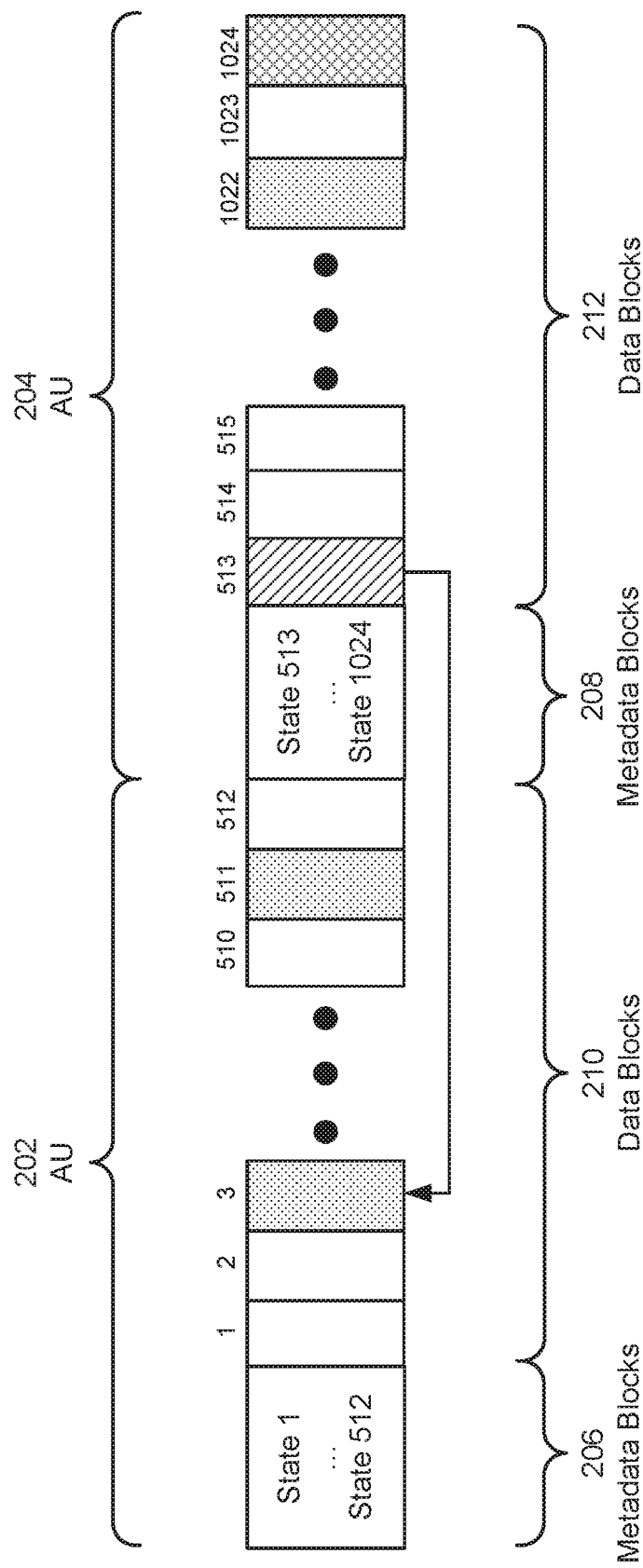
FIG. 2 illustrates an exemplary data structure in a storage management system in accordance with one or more embodiments.

Like the AU chunks, each fixed-size AU may include a series of contiguous data blocks and metadata used to manage storage of differential snapshots in the data blocks. As shown in FIG. 2, a first AU 202 may contain a set of data blocks 210 identified by block numbers ranging from 1 to 512. A second AU 204 may include another set of data blocks 212 identified by block numbers ranging from 513 to 1024. For example, data blocks 210-212 may each have a size of 4 KB to form two fixed-size AUs 202-204 of 2 MB each. AUs 202-204 may reside in the same AU chunk or different adjacent AU chunks within a virtual disk (e.g. virtual disk 106 of FIG. 1).

One or more metadata blocks 206 in AU 202 may track the state of individual data blocks 210 in AU 202, and one or more metadata blocks 208 in AU 204 may track the state of individual data blocks 212 in AU 204. Continuing with the previous example, each AU 202-204 may include a single 4 KB metadata block that tracks the state of 512 data blocks 210-212 within the AU. As a result, the state of each data block may be indicated in an 8-byte entry within the metadata block for the same AU. As with the AU mappings of FIG. 1, the offset of a given entry in the metadata block may be used to identify the data block represented by the corresponding state (e.g., by dividing the offset by 8 to obtain a numeric identifier for the data block).

More specifically, metadata blocks 206-208 may specify the state of each data block using one of several types of values. First, metadata blocks 206-208 may use a set of reserved values to identify data blocks 210-212 as free blocks, local allocations, reserved for storing block numbers of inherited blocks that have been deleted in the snapshot, and/or reserved for storing block ownership information in an AU that is shared by multiple snapshots. The reserved values may include reserved blocks and/or extremely large values that are higher than the largest block number in the AU chunk and/or virtual disk.

A data block that is identified as free may be available for subsequent allocation. For example, a free data block may be currently unused by any snapshot.

A data block that is identified as a local allocation may be allocated for use in storing data in the snapshot owning the corresponding AU. For example, the data block may store data that has been written to a snapshot since the creation of the snapshot. In other words, a data block that is a local allocation may store data that was newly written since the creation of the snapshot instead of data that overwrites existing data from previous snapshots. To indicate that the data block is a local allocation, the corresponding metadata block may store, in an entry for the data block, the block number of the data block and/or a reserved value indicating local allocation of the data block from the snapshot owning the corresponding AU.

A data block that is identified as reserved for storing block ownership information in a shared AU may contain a set of entries identifying ownership of individual blocks in the AU by a set of snapshots. For example, the data block may include a set of entries representing other data blocks in the AU. Each entry may store a snapshot identifier for a snapshot that owns the corresponding data block. In another example, the data block may include a set of entries representing snapshots that share the AU. Each entry may identify a snapshot and include a list of block numbers and/or ranges of block numbers of data blocks owned by the snapshot.

A data block that is identified as reserved for storing block numbers of inherited blocks that have been deleted in the snapshot may include a list of block numbers of data blocks from previous snapshots that have been deleted in a given snapshot. For example, the list may include data blocks allocated to previous snapshots inherited by the snapshot that have since been deleted in the snapshot. Thus, deletion of a block may be performed by first identifying the snapshot owning the block (e.g., using an AU mapping for the AU containing the block and/or a data block that stores block ownership information for a shared AU). If the block is owned by the current snapshot and/or a writable snapshot, the block's entry in a metadata block of the AU is marked free to allow the block to be subsequently allocated. If all blocks in the AU have been freed, the AU mapping for the AU may be updated to the reserved value for "free." If the block is inherited by the current snapshot from a read-only snapshot, the block number of the block is added to the list of block numbers from previous snapshots that have been deleted by the current snapshot.

Second, metadata blocks 206-208 may identify individual data blocks storing data in a snapshot as allocations from original blocks storing data in previous snapshots. A block in an AU may be allocated from an original block from a previous snapshot if data stored in the block overwrites data in the original block. For example, a portion of a file and/or database may be created in a previous snapshot and modified in a later snapshot. Because older snapshots are read-only to allow differential snapshotting of the data set, the portion may be copied from one or more blocks owned by the previous snapshot to one or more blocks owned by the later snapshot for subsequent modification in the later snapshot.

In other words, modifications to data in a read-only snapshot may be stored in a separate writable snapshot using a copy-on-write (COW) operation that copies the data to blocks owned by the writable snapshot before the data is modified at the blocks. In turn, metadata blocks 206-208 for AUs 202-204 may track the inheritance and modification of data across snapshots by specifying, in a metadata block entry of a data block, the block number of an original block owned by a previous snapshot that was copied to the data block in a COW operation before the data block was modified.

In one or more embodiments, metadata blocks 206-208 and AU mappings for AUs 202-204 are used to streamline execution of writes to snapshots stored in the virtual disk and freeing of blocks after the snapshots are deleted. First, a write to a data block may be performed by using the block number of the block to locate the block within an AU, using an AU mapping for the AU to obtain a snapshot identifier for a snapshot, and executing the write based on the snapshot identifier. If the snapshot identifier represents a writable snapshot (e.g., the current snapshot in which the write is to be performed), the write may be applied to the block. If the snapshot identifier represents a read-only snapshot (e.g., a previous snapshot inherited by the current snapshot), the block may be copied to a free block associated with a writable snapshot, and the write may be applied to the free block.

For example, a write to a portion of a file in a writable snapshot may be mapped to one or more block numbers of blocks storing the portion in the virtual disk. Because data blocks in all AUs are numbered in sequential, monotonically increasing order, each block number may be mapped to the AU chunk and AU containing the corresponding block based on the range of block numbers encompassed by the AU chunk and AU. The AU mapping for the AU may then be used to identify the snapshot to which the AU is assigned. If the AU is shared by multiple snapshots, a snapshot identifier for the snapshot owning the individual data block may be obtained from one or more data blocks reserved for storing block ownership information in the shared AU. If the snapshot to which the block belongs is the current snapshot or an otherwise writable snapshot, the write may be applied to the block. If the snapshot owning the block is not the current snapshot and/or otherwise writable, a free, second block in an AU owned or shared by the current snapshot is found using metadata blocks in the AU and/or a data block that stores block ownership information for a shared AU, and the metadata block entry of the second block is updated to the block number of the block to indicate allocation of the second block from the block. A COW operation may then be used to copy data from the block to the free block, and the write may be applied to the copied data.

Second, deletion of a snapshot may be performed by reclaiming blocks from the snapshot that are no longer referenced by a child snapshot of the snapshot. For example, blocks from a deleted snapshot may be reclaimed or freed if the blocks have been COWed to the child snapshot and/or deleted in the child snapshot. To reclaim the blocks, the AU mappings may be used to identify a subset of the AUs owned by the child snapshot. Metadata blocks in each of the identified AUs may then be used to identify a set of blocks in the deleted snapshot that have been replaced by newer versions of the blocks in the child snapshot. Finally, the identified blocks may be marked as free in the corresponding metadata block entries.

For example, the child snapshot may be identified using the snapshot identifier of the deleted snapshot and a reference to the snapshot identifier from a different snapshot identifier of the child snapshot, which indicates creation of the child snapshot from the deleted snapshot. Next, the AU mappings may be used to identify all AUs owned or potentially shared by the child snapshot, and metadata block entries and/or reserved data blocks in the AUs may be used to obtain a set of block numbers representing original blocks in previous snapshots from which blocks in the child snapshot have been allocated. The block numbers may be obtained as valid block numbers in the metadata block entries that are different from the block numbers represented by the offsets of the metadata block entries. The block numbers may be used to access additional metadata blocks in other AUs containing the original blocks, and the additional metadata blocks may be used to identify a subset of the original blocks as owned exclusively by the deleted snapshot. The subset may then be marked as free in the additional metadata blocks, and remaining AUs and/or data blocks from the deleted snapshot may be transferred to the child snapshot by updating the corresponding AU mappings and/or block ownership information in shared AUs. Block numbers of the freed blocks may also be removed from a list of inherited blocks that have been deleted in the child snapshot.

Because the virtual disk is laid out in a series of repeating, fixed-size structures, access to data required to perform COW checks may be performed in constant time, independently of the size of the virtual disk. In addition, multi-block writes that require multiple COW operations and updating of multiple metadata block entries may be batched into a single update to a metadata block because block allocations associated with the COW operations are controlled by the current snapshot. Finally, using metadata block entries in multiple metadata blocks and block numbers to specify inheritance of data across snapshots may reduce memory overhead, contention, and/or serialization associated with conventional techniques that use centralized bitmaps or logs to record COW operations and process deletion of data or snapshots.

4. Example Embodiment

A detailed example is described below for purposes of clarity. Components and/or operations described below should be understood as one specific example, which may not be applicable to certain embodiments. Accordingly, components and/or operations described below should not be construed as limiting the scope of any of the claims.

Continuing with the discussion of FIG. 2, metadata blocks 206-208 may include entries that identify data blocks 210-212 with block numbers of 1, 2, 510, 512, 514, 515, and 1023 as free. For example, entries in metadata blocks 206-208 at offsets corresponding to block numbers 1, 2, 510, 512, 514, 515, and 1023 may store a reserved value representing a free block.

Metadata blocks 206-208 may also include entries that identify block numbers 3, 511, and 1022 as local allocations for use by the snapshots owning the corresponding AUs 202-204. For example, entries in metadata blocks 206-208 at offsets corresponding to block numbers 3, 511, and 1022 may store the same respective block numbers.

Metadata block 208 may include an entry that identifies block number 513 as allocated from data in block number 3. For example, the entry may be found at the offset representing block number 513 and store the number 3 to indicate that data from block number 3 was copied to block number 513 and subsequently modified within block 513. The entry may further indicate that block number 513 is owned by a child snapshot of the snapshot owning block number 3. If the snapshot owning block number 3 is subsequently deleted, the entry may be used to identify block number 3 as an original block from which block number 513 was allocated. In turn, an entry at the offset representing block number 3 in metadata blocks 206 may be used to identify block number 3 as a local allocation for the deleted snapshot and free block number 3 for subsequent reallocation to a different snapshot.

Metadata blocks 208 may also include an entry that identifies block number 1024 as reserved for storing additional metadata used in managing the snapshots. For example, the entry may store a reserved value indicating that block number 1024 is used to store block ownership information for blocks in a shared AU 204. In another example, the entry may store a different reserved value indicating that block number 1024 is used to store block numbers of inherited blocks from previous snapshots that have been deleted in the snapshot.

Figure 3:
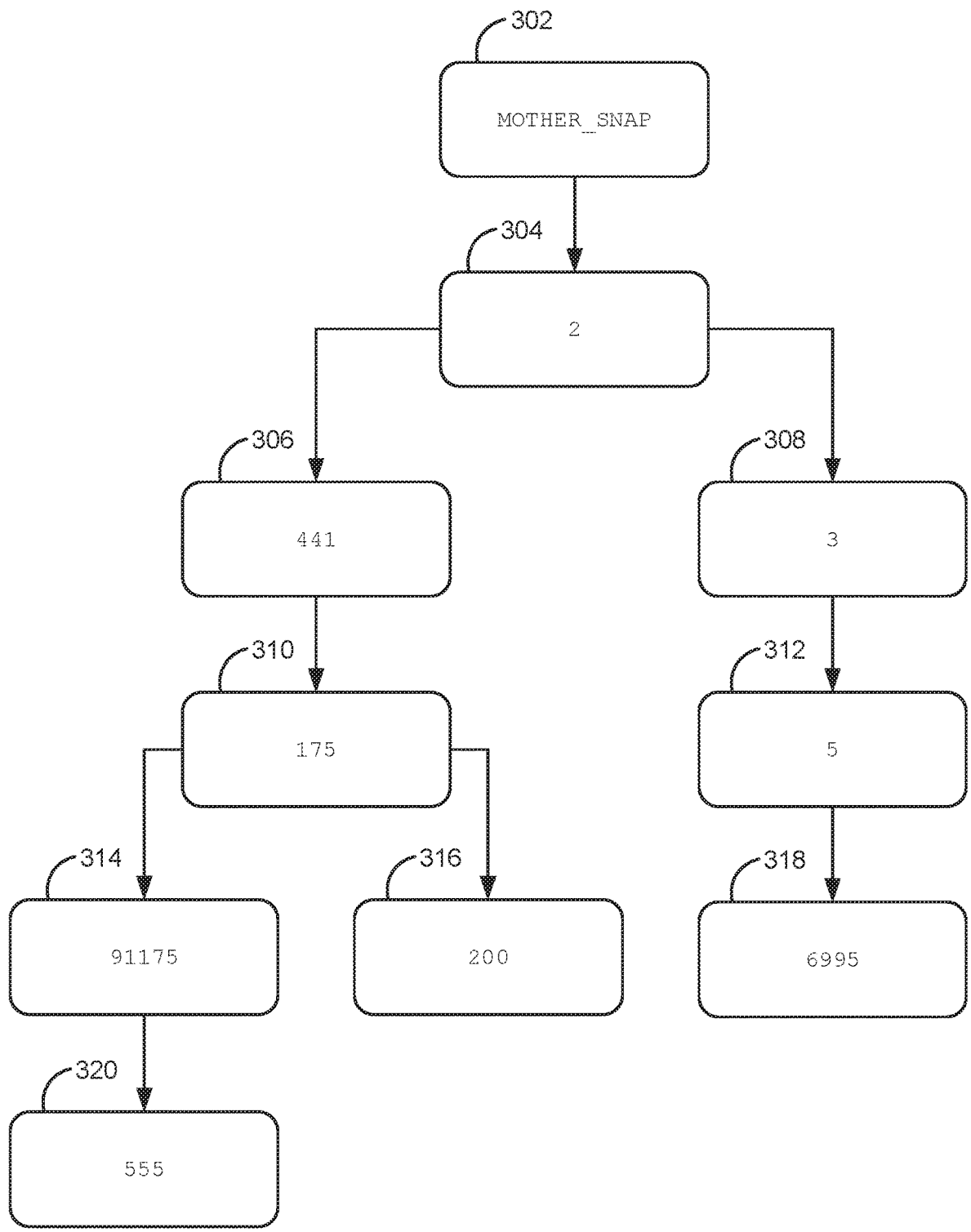
FIG. 3 illustrates an exemplary inheritance tree for a set of snapshots in accordance with one or more embodiments.

FIG. 3 illustrates an exemplary inheritance tree for a set of snapshots 302-320 in accordance with one or more embodiments. Snapshot 302 may represent the initial, empty state of the data set stored in snapshots 302-320. To identify snapshot 302 as the earliest snapshot, the snapshot identifier for snapshot 302 may be set to a reserved value represented by "MOTHER SNAP." For example, the reserved value may be set to 0 or a number that is outside the range of valid snapshot identifiers.

Snapshot 304 may be created from snapshot 302 and have a snapshot identifier of 2. Because snapshot 302 contains no data, snapshot 304 may store all changes to the data set from the time of creation to the time at which snapshot 304 became read-only (e.g., the time at which another snapshot was created from snapshot 304).

Snapshots 306-308 may be created from snapshot 304 and have snapshot identifiers of 441 and 3, respectively. As a result, snapshots 306-308 may be used to store two different sets of changes to the data set in snapshot 304. For example, each snapshot 306-308 may be created from snapshot 304 at the same time or at different times. In turn, snapshots 306-308 may track different sets of modifications to snapshot 304 during testing of the data set in snapshot 304, customization of the data set for different users, and/or other use cases related to related to copying and modifying data sets. After both snapshots 306-308 are created, snapshot 304 may become a branch point in the inheritance tree.

Snapshot 310 may be created from snapshot 306 and have a snapshot identifier of 175. As a result, snapshot 310 may store changes to snapshot 306 between the time at which snapshot 310 was created and the time at which snapshot 310 became read-only. Similarly, snapshot 312 may be created from snapshot 308, include a snapshot identifier of 5, and store changes to snapshot 308 between the time of creation of snapshot 312 and the time at which snapshot 312 became read-only.

Like snapshots 306-308, snapshots 314-316 may be created from the same snapshot 310. As a result, snapshot 310 may represent another branch point in the inheritance tree. In turn, snapshots 314-316 may store and/or track different sets of modifications to snapshot 310. Because snapshot 316 is the latest snapshot in a chain of inheritance that includes snapshots 302, 304, 306, and 310, snapshot 316 may be writable until a new snapshot is created from snapshot 316.

Snapshot 318 may be created from snapshot 312, include a snapshot identifier of 6905, and store changes to snapshot 312 after the time of creation of snapshot 318. Because snapshot 318 is the latest snapshot in a chain of inheritance that includes snapshots 302, 304, 308, and 312, snapshot 318 may be writable until a new snapshot is created from snapshot 318.

Snapshot 320 may be created from snapshot 314, include a snapshot identifier of 555, and store changes to snapshot 314 after the time of creation of snapshot 320. Because snapshot 320 is the latest snapshot in a chain of inheritance that includes snapshots 302, 304, 306, 310, and 314, snapshot 320 may be writable until a new snapshot is created from snapshot 320.

Writable snapshots 316-320 may be restored from any snapshots in the respective chains of inheritance. Such restoration may be performed in the event of data corruption, an attack, accidental data deletion, and/or other problems with the data set. After a writable snapshot is restored to a parent snapshot in its inheritance chain, the snapshot identifier of the writable snapshot may be linked to the snapshot identifier of the parent snapshot to indicate restoration of the writable snapshot from the parent snapshot. For example, restoration of snapshot 318 from snapshot 308 may result in an edge from snapshot 308 to snapshot 318 in the inheritance tree instead of the edge from snapshot 312 to snapshot 318.

New snapshots may also be created from any snapshot 302-320 in the inheritance tree. After a new snapshot is created, an edge between the new snapshot and an older parent snapshot from which the new snapshot was created may be added to the inheritance tree. The parent snapshot may also be converted to read-only if the parent was a writable snapshot before the creation of the new snapshot.

To facilitate freeing of blocks from deleted snapshots, all snapshots in the inheritance tree may be deleted, except for branch points (i.e., snapshots 304 and 310). More specifically, a snapshot that is a non-branch-point may be deleted by identifying and freeing blocks in the snapshot that are not used by a single child snapshot and transferring ownership of remaining blocks in the deleted snapshot to the child snapshot. On the other hand, deletion of a snapshot that is a branch point may require identifying and freeing blocks in the snapshot that are not used by multiple child snapshots and performing complicated operations to transfer ownership of remaining blocks in the deleted snapshot to the child snapshots.

5. Storing Snapshots in a Storage Management System

Figure 4:
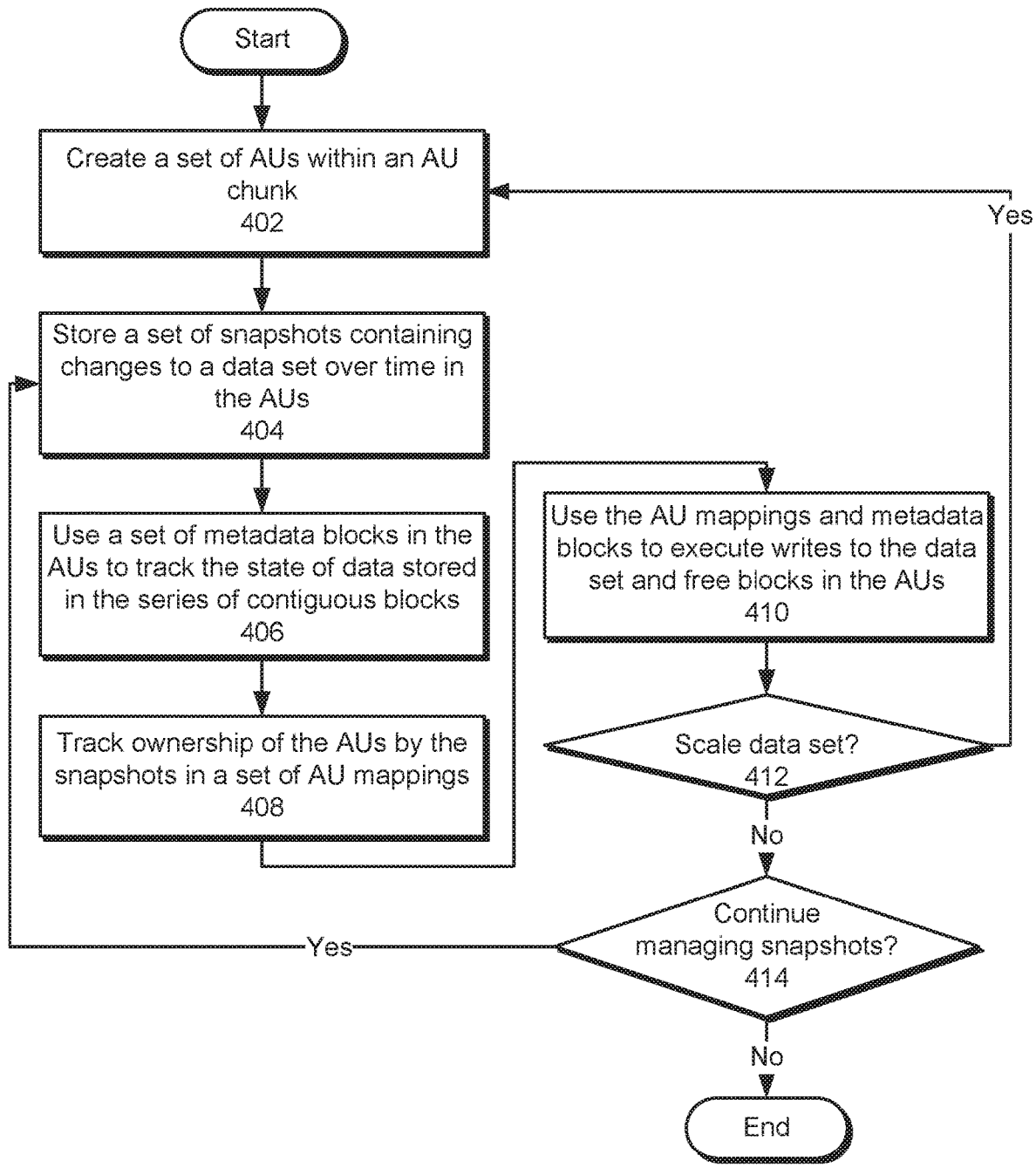
FIG. 4 illustrates a flowchart of storing a set of snapshots in a storage management system in accordance with one or more embodiments.

FIG. 4 illustrates a flowchart of storing a set of snapshots in a storage management system in accordance with one or more embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a set of AUs is created within an AU chunk (operation 402). Each AU may include a series of contiguous blocks, such as blocks that are identified using sequential, monotonically increasing block numbers. In addition, the AUs may span non-overlapping ranges of block numbers.

For example, the first four AUs in the AU chunk may span the block numbers of 1-512, 513-1024, 1025-1536, and 1537-2048, respectively.

Next, a set of snapshots containing changes to a data set over time is stored in the AUs (operation 404). For example, the snapshots may be stored as differential snapshots. Thus, earlier snapshots from which later snapshots are generated may be read-only, while the latest snapshot in a chain of inheritance for the snapshots may be writable to allow additional modifications to the data set. Changes to the data set between a parent snapshot and a child snapshot may be stored in the contiguous data blocks of one or more AUs assigned to the child snapshot.

In turn, a set of metadata blocks in the AUs is used to track the state of data stored in the series of contiguous blocks (operation 406). For example, metadata blocks for a given AU may include a set of entries representing the series of contiguous blocks in the AU. Each entry may identify the corresponding block as a free block that can be allocated, a local allocation of a block from a snapshot that owns the AU, an allocation of a block in a snapshot from an original block in a previous snapshot, a block that stores block numbers of inherited blocks that have been deleted in the snapshot, and/or a block that stores ownership, by multiple snapshots, of other blocks in a shared AU.

Ownership of the AUs by the snapshots is additionally tracked in a set of AU mappings (operation 408) between the AUs and snapshot identifiers representing the snapshots. For example, each AU mapping may include a snapshot identifier of a snapshot owning the corresponding AU, and the offset of the AU mapping in a reserved block in the AU chunk may be used to obtain a numeric identifier for the AU. In turn, "ownership" of the AU by the snapshot represented by the AU mapping may indicate that the AU is used to store data in the snapshot. If the AU is shared by multiple snapshots, the AU mapping may contain a reserved value or flag representing a shared AU. If the AU is free, the AU mapping may contain a different reserved value representing a free AU.

The AU mappings and metadata blocks are then used to execute writes to the data set and free blocks in the AUs (operation 410). Executing writes to a snapshotted data set is described in further detail below with respect to FIG. 5, and freeing blocks in a snapshotted data set is described in further detail below with respect to FIG. 6.

The data set may be scaled (operation 412) as snapshots and/or data are added to the data set. For example, the virtual disk on which the data set is stored may be scaled in response to anticipated use of the virtual disk, a change in physical storage from which the virtual disk is created, a reduction in available space on the virtual disk, user input, and/or other triggers or factors. If the data set is to be scaled, an additional set of AUs is created within an additional AU chunk (operation 402), and additional snapshots and/or data in the data set are stored and managed using the AUs and associated AU mappings and metadata blocks (operations 404-410). If the data set does not require scaling, creation of an additional AU chunk may be omitted.

Snapshots may continue to be managed (operation 414) using the AUs, AU mappings, and metadata blocks. If management of the snapshots is to continue, the snapshots are stored in AUs within one or more AU chunks (operation 404), and the metadata blocks and AU mappings are used to track ownership and use of the AUs by the snapshots (operations 406-408) and execute writes to the data set and free blocks in the AUs (operation 410). Such management of snapshots and optional scaling of the data set may continue until differential snapshotting of the data set is no longer performed.

6. Executing Writes to a Snapshotted Data Set

Figure 5:
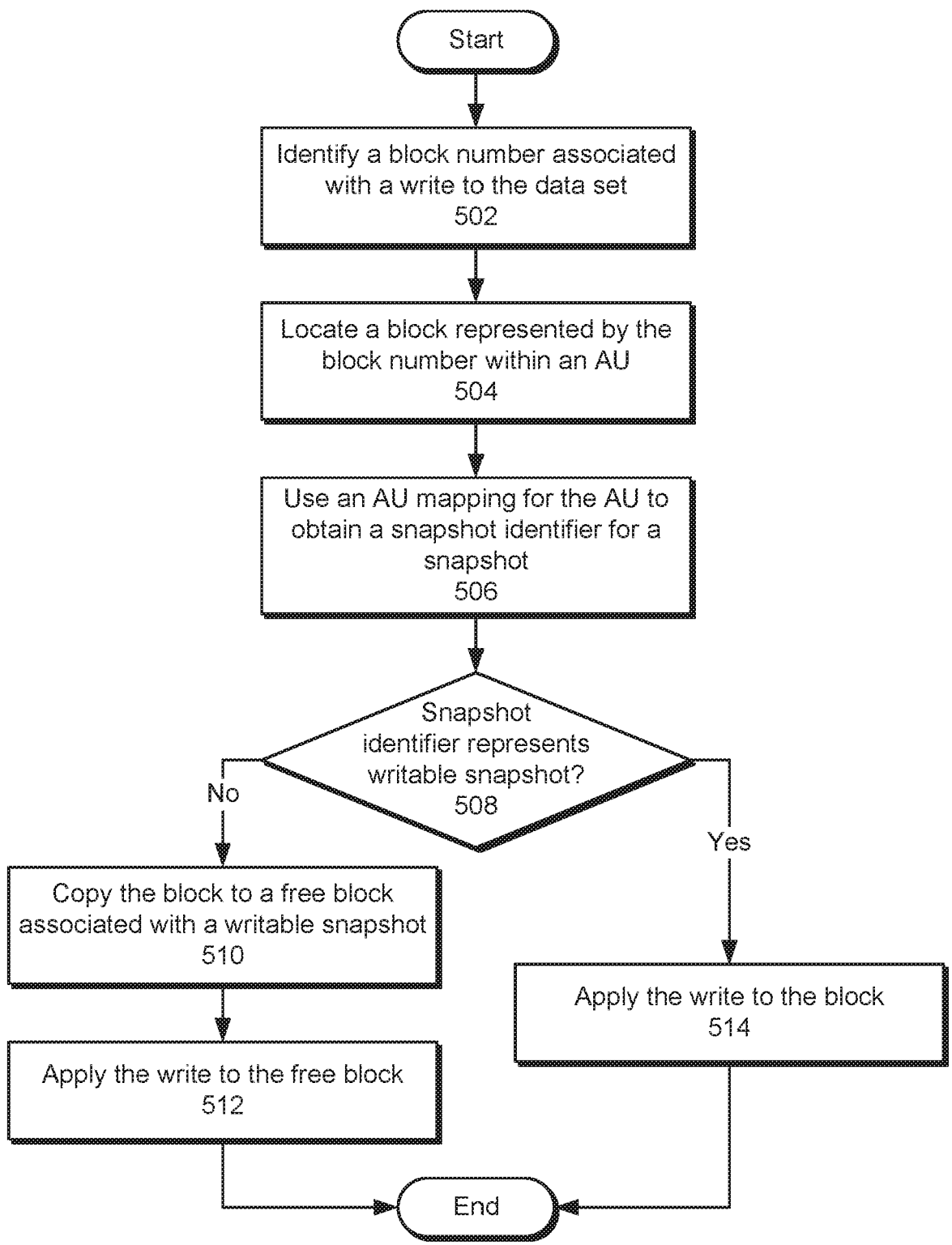
FIG. 5 illustrates a flowchart of executing writes to a snapshotted data set in accordance with one or more embodiments.

FIG. 5 illustrates a flowchart of executing writes to a snapshotted data set in accordance with one or more embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a block number associated with a write to the data set is identified (operation 502). For example, the block number may be identified using a mapping from a portion of the data set to which the write pertains to the block number of the block storing the portion. Next, a block represented by the block number is located within an AU (operation 504). For example, the block number may be matched to a range of block numbers spanned by the AU. An AU mapping for the AU is then used to obtain a snapshot identifier for a snapshot (operation 506). For example, the snapshot identifier may be obtained from an AU mapping at an offset representing the AU within a block that is reserved for storing AU mappings in the AU chunk containing the AU.

The snapshot identifier may represent a writable snapshot (operation 508). For example, the snapshot may be writable when the snapshot identifier belongs to the latest snapshot in a chain of inheritance from the earliest snapshot of the data set. If the snapshot identifier belongs to a snapshot that is a parent of the latest snapshot, the snapshot may be read-only.

If the snapshot identifier does not belong to a writable snapshot, the block is copied to a free block associated with a writable snapshot (operation 510). For example, the block may be copied from an AU owned by a read-only snapshot to a free block in an AU belonging to the writable snapshot. The write is then applied to the free block (operation 512). In addition, the state of the free block may be changed, in a metadata block for the AU, from free to an allocation from the block in the read-only snapshot.

7. Freeing Blocks in a Snapshotted Data Set

Figure 6:
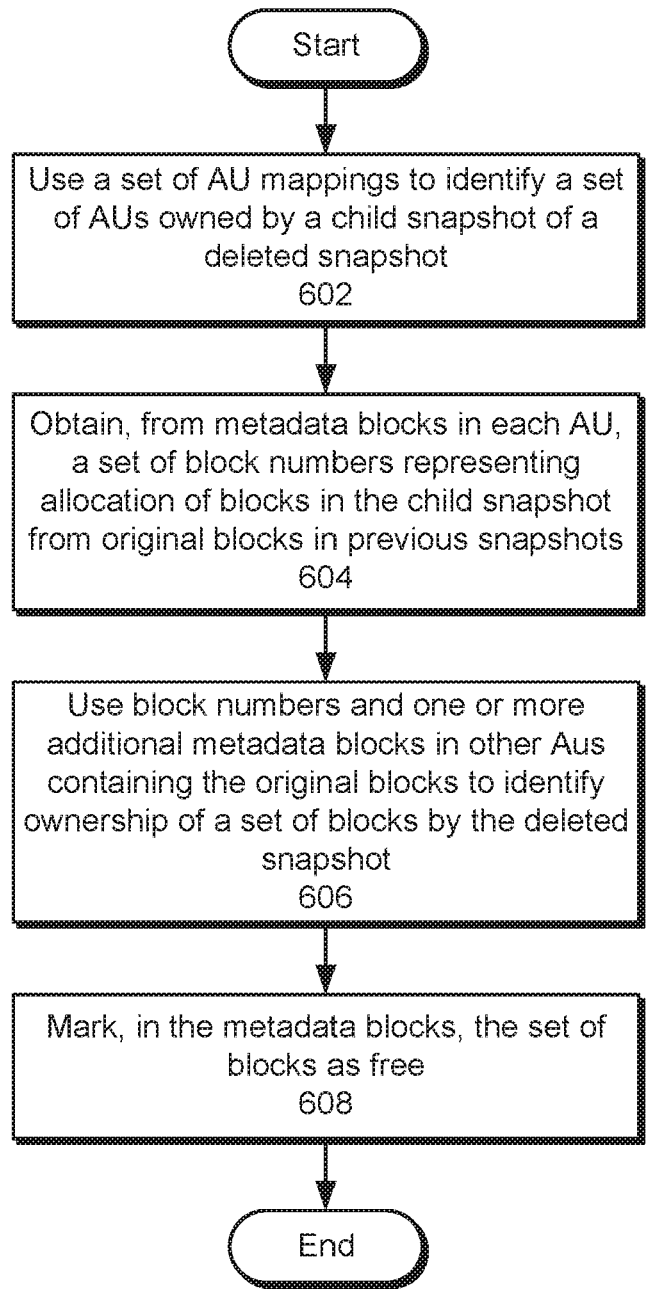
FIG. 6 illustrates a flowchart of freeing blocks in a snapshotted data set in accordance with one or more embodiments.

FIG. 6 illustrates a flowchart of freeing blocks in a snapshotted data set in accordance with one or more embodiments. In one or more embodiments, one or more of the steps may be omitted, repeated, and/or performed in a different order. Accordingly, the specific arrangement of steps shown in FIG. 6 should not be construed as limiting the scope of the embodiments.

First, a set of AU mappings is used to identify a set of AUs owned by a child snapshot of a deleted snapshot (operation 602). For example, the AU mappings may be used to obtain all AUs assigned to the child snapshot and/or potentially shared by the child snapshot. Next, a set of block numbers representing allocation of blocks in the child snapshot from original blocks in previous snapshots is obtained from metadata blocks in each AU (operation 604). For example, the metadata blocks may be scanned for valid block numbers that differ from the block numbers represented by the corresponding metadata block entries. If any shared AUs are found, reserved data blocks in the shared AUs are used to identify any blocks owned by the child snapshot in the shared AUs, and the metadata block entries of the identified blocks may be used to determine if any of the blocks have been allocated from other snapshots.

The block numbers and one or more additional metadata blocks in other AUs containing the original blocks are then used to identify ownership of a set of blocks by the deleted snapshot (operation 606). For example, metadata block entries of original block numbers identified in operation 604 and mappings identifying AUs or blocks owned by the deleted snapshot may be used to identify a subset of the block numbers as local allocations associated with the deleted snapshot. Finally, the identified set of blocks is marked as free in the metadata blocks (operation 608). For example, metadata block entries for the blocks may be changed from the block numbers of the blocks to a reserved value representing a free block.

8. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread). A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application-programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

9. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

10. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
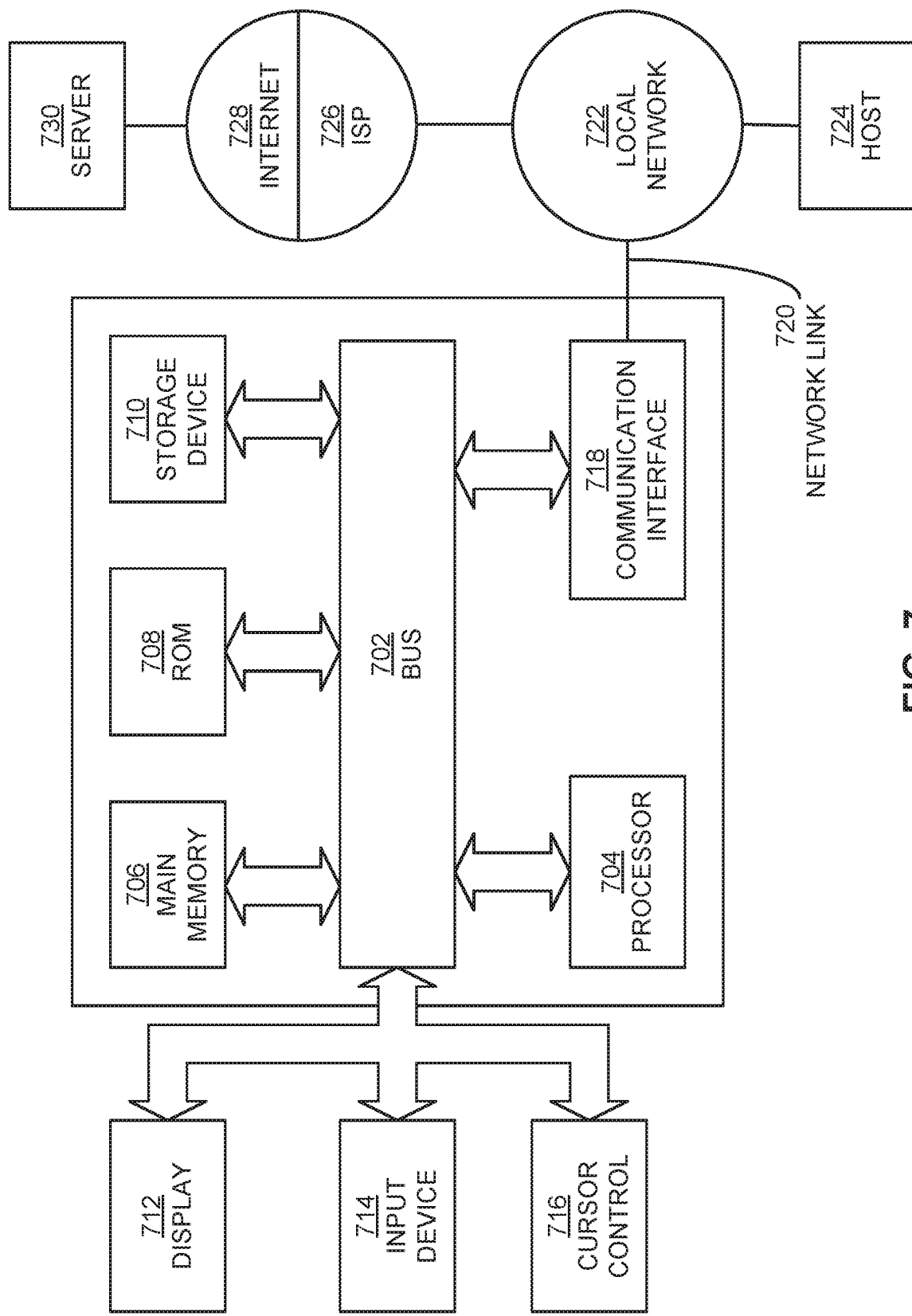
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:

dividing available storage in a filesystem into one or more contiguous allocation unit (AU) chunks, wherein each of the AU chunks comprises:

a set of contiguous fixed-size AUs, wherein each AU in the set of contiguous fixed-size AUs comprises a series of contiguous fixed-size blocks and one or more metadata blocks that track the state of individual blocks in the contiguous fixed-sized blocks; and a set of contiguous AU mappings that is adjacent to the set of contiguous fixed-size AUs, wherein each AU mapping in the set of contiguous AU mappings represents a different AU in the set of contiguous fixed-size AUs;

storing, in a first AU mapping in the set of contiguous AU mappings, a first snapshot identifier for a snapshot of the filesystem to indicate allocation of a first AU represented by the first AU mapping to the snapshot; and allocating a first block in the first AU to the snapshot by storing, in a first entry representing the first block in the one or more metadata blocks in the first AU, a first reserved value representing a local allocation of the first block to the snapshot.

2. The medium of claim 1, wherein the operations further comprise:

identifying, in the one or more metadata blocks in the first AU, one or more entries storing a second reserved value representing a free block that is available for subsequent allocation; and selecting the first block in the first AU for allocation to the snapshot from one or more blocks in the first AU represented by the one or more entries.

3. The medium of claim 1, wherein the operations further comprise:

during a write to a second block by the snapshot, obtaining a second snapshot identifier from a second AU mapping for a second AU containing the second block;

when the second snapshot identifier does not match the first snapshot identifier, copying the second block to a free block in the first AU; and applying the write to the free block.

4. The medium of claim 3, wherein the operations further comprise:

adding a block number of the second block to a third block in the first AU that stores block numbers of inherited blocks that have been deleted in the snapshot; and storing, in a second entry representing the third block in the one or more metadata blocks in the first AU, a second reserved value representing storing the block numbers of the inherited blocks that have been deleted in the snapshot.

5. The medium of claim 4, wherein the operations further comprise:

during deletion of an older snapshot that is a parent of the snapshot, identifying the third block storing the block numbers of the inherited blocks that have been deleted in the snapshot based on the second reserved value in the second entry representing the third block;

identifying, based on the set of contiguous AU mappings, a subset of the block numbers owned by the older snapshot; and marking blocks represented by the subset of the block numbers as free.

6. The medium of claim 1, wherein the operations further comprise:

storing, in a second AU mapping in the set of contiguous AU mappings, a second reserved value indicating sharing of a second AU represented by the second AU mapping by multiple snapshots; and storing, in a second entry in the one or more metadata blocks in the second AU, a third reserved value representing use of a second block represented by the second entry in storing ownership of individual blocks in the first AU by multiple snapshots.

7. The medium of claim 6, wherein the operations further comprise:

identifying the second AU based on an offset of the second AU mapping in the set of contiguous AU mappings.

8. The medium of claim 6, wherein the operations further comprise:

during a write to a third block in the second AU by the snapshot, obtaining, from the second block, a second snapshot identifier for a second snapshot owning the second block; and comparing the second snapshot identifier to the first snapshot identifier for the snapshot.

9. The medium of claim 8, wherein the operations further comprise:

when the second snapshot identifier does not match the first snapshot identifier, copying the second block to a free block in the first or second AU;

applying the write to the free block; and updating the second block to indicate ownership of the free block by the first snapshot.

10. The medium of claim 8, wherein the operations further comprise:

when the second snapshot identifier matches the first snapshot identifier, applying the write to the second block.

11. The medium of claim 1, wherein allocating the first block in the first AU to the snapshot comprises:

matching a block number of the first block to an offset of the first entry in the one or more metadata blocks.

12. The medium of claim 1, wherein the operations further comprise:

identifying, in the set of contiguous AU mappings, one or more AU mappings storing a second reserved value representing a free AU that is available for subsequent allocation; and selecting the first AU for allocation to the snapshot based on the one or more AU mappings.

13. The medium of claim 1, wherein the set of snapshots comprises:

a writable snapshot; and one or more read-only snapshots preceding the writable snapshot.

14. A method, comprising:

dividing available storage in a filesystem into one or more contiguous allocation unit (AU) chunks, wherein each of the AU chunks comprises:

a set of contiguous fixed-size AUs, wherein each AU in the set of contiguous fixed-size AUs comprises a series of contiguous fixed-size blocks and one or more metadata blocks that track the state of individual blocks in the contiguous fixed-sized blocks; and a set of contiguous AU mappings that is adjacent to the set of contiguous fixed-size AUs, wherein each AU mapping in the set of contiguous AU mappings represents a different AU in the set of contiguous fixed-size AUs;

storing, in a first AU mapping in the set of contiguous AU mappings, a first snapshot identifier for a snapshot of the filesystem to indicate allocation of a first AU represented by the first AU mapping to the snapshot; and allocating a first block in the first AU to the snapshot by storing, in a first entry representing the first block in the one or more metadata blocks in the first AU, a first reserved value representing a local allocation of the first block to the snapshot.

15. The method of claim 14, further comprising:

identifying, in the one or more metadata blocks in the first AU, one or more entries storing a second reserved value representing a free block that is available for subsequent allocation; and selecting the first block in the first AU for allocation to the snapshot from one or more blocks in the first AU represented by the one or more entries.

16. The method of claim 14, wherein the operations further comprise:

during a write to a second block by the snapshot, obtaining a second snapshot identifier from a second AU mapping for a second AU containing the second block;

when the second snapshot identifier does not match the first snapshot identifier, copying the second block to a free block in the first AU; and applying the write to the free block.

17. The method of claim 16, further comprising:

adding a block number of the second block to a third block in the first AU that stores block numbers of inherited blocks that have been deleted in the snapshot; and storing, in a second entry representing the third block in the one or more metadata blocks in the first AU, a second reserved value representing storing the block numbers of the inherited blocks that have been deleted in the snapshot.

18. The method of claim 17, further comprising:

during deletion of an older snapshot that is a parent of the snapshot, identifying the third block storing the block numbers of the inherited blocks that have been deleted in the snapshot based on the second reserved value in the second entry representing the third block;

identifying, based on the set of contiguous AU mappings, a subset of the block numbers owned by the older snapshot; and marking blocks represented by the subset of the block numbers as free.

19. The method of claim 14, further comprising:

identifying, in the set of contiguous AU mappings, one or more AU mappings storing a second reserved value representing a free AU that is available for subsequent allocation; and selecting the first AU for allocation to the snapshot based on the one or more AU mappings.

20. An apparatus, comprising:

one or more processors; and memory storing instructions that, when executed by the one or more processors, cause the apparatus to:

divide available storage in a filesystem into one or more contiguous allocation unit (AU) chunks, wherein each of the AU chunks comprises:

a set of contiguous fixed-size AUs, wherein each AU in the set of contiguous fixed-size AUs comprises a series of contiguous fixed-size blocks and one or more metadata blocks that track the state of individual blocks in the contiguous fixed-sized blocks; and a set of contiguous AU mappings that is adjacent to the set of contiguous fixed-size AUs, wherein each AU mapping in the set of contiguous AU mappings represents a different AU in the set of contiguous fixed-size AUs;

store, in a first AU mapping in the set of contiguous AU mappings, a first snapshot identifier for a snapshot of the filesystem to indicate allocation of a first AU represented by the first AU mapping to the snapshot; and allocate a first block in the first AU to the snapshot by storing, in a first entry representing the first block in the one or more metadata blocks in the first AU, a first reserved value representing a local allocation of the first block to the snapshot.

* * * * *